United States Patent [19]

Banyas et al.

[11] 3,968,870
[45] July 13, 1976

[54] SPIN CYCLE MECHANISM FOR GLASS ARTICLE FORMING MACHINE

[75] Inventors: John D. Banyas, Toledo; Edward A. Ross, Waterville, both of Ohio

[73] Assignee: Owens-Illinois, Inc., Toledo, Ohio

[22] Filed: Sept. 27, 1974

[21] Appl. No.: 510,119

Related U.S. Application Data

[62] Division of Ser. No. 419,535, Nov. 28, 1973, Pat. No. 3,902,727, which is a division of Ser. No. 244,700, Aug. 30, 1972, Pat. No. 3,868,010, which is a division of Ser. No. 77,425, Oct. 2, 1970, Pat. No. 3,726,659.

[52] U.S. Cl. .................................. 198/240; 198/241; 198/203; 198/208
[51] Int. Cl.² ........................................ B65G 47/24
[58] Field of Search ........................... 198/240–243, 198/208, 179, 203, 189

[56] References Cited
UNITED STATES PATENTS

| | | | |
|---|---|---|---|
| 1,765,419 | 6/1930 | Goss | 198/240 |
| 2,612,988 | 10/1952 | Andrews | 198/208 |
| 2,640,584 | 6/1953 | Robb et al. | 198/179 |
| 3,868,010 | 2/1975 | Banyas et al. | 198/240 |

*Primary Examiner*—Frank E. Werner
*Assistant Examiner*—James M. Slattery
*Attorney, Agent, or Firm*—J. R. Nelson

[57] ABSTRACT

Spin cycle apparatus employed in a glass article forming machine to drive article carrying chucks in rotation as the chucks are conveyed through burner sections of the machine. The spin cycle apparatus includes a spin cycle chain mounted on the machine frame to extend along a portion of the path followed by sprockets mounted on the individual chucks. As the chuck is carried along its conveying path, the sprocket engages the chain to cause the chuck to rotate as it is advanced. That section of the chain which is initially contacted by chuck sprockets is aligned at an angle convergent to the sprocket path and is resiliently maintained at a somewhat looser tension than is the main sprocket driving portion of the chain. This distributes the length of the chain over which the randomly oriented sprocket teeth initially engage the chain and cushions the impact between the sprocket teeth and the chain.

Two embodiments are disclosed. In one embodiment, the chain is stationary and the rate of spinning rotation of the chuck is dependent upon the conveyor line speed. In the other embodiment, an endless chain having one run located to operatively engage the chuck sprockets is driven by a reversible variable speed motor so that the rate of chuck rotation can be adjusted independently of conveying line speed by appropriate selection of the direction and speed at which the endless spin cycle chain is driven.

6 Claims, 5 Drawing Figures

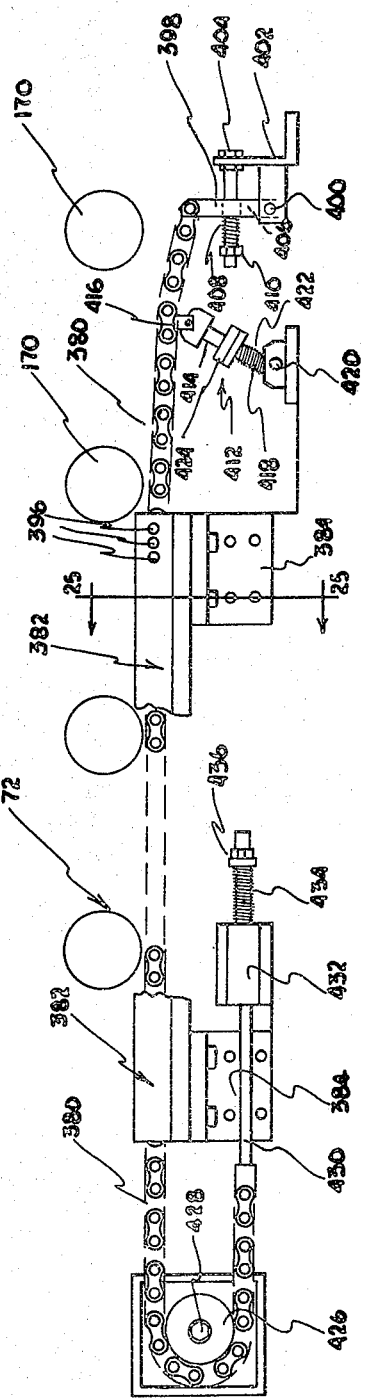
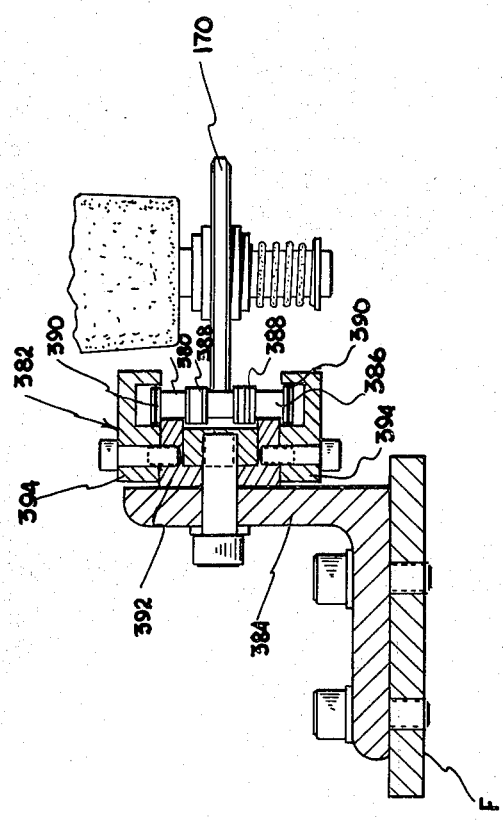
FIG. 2
FIG. 3

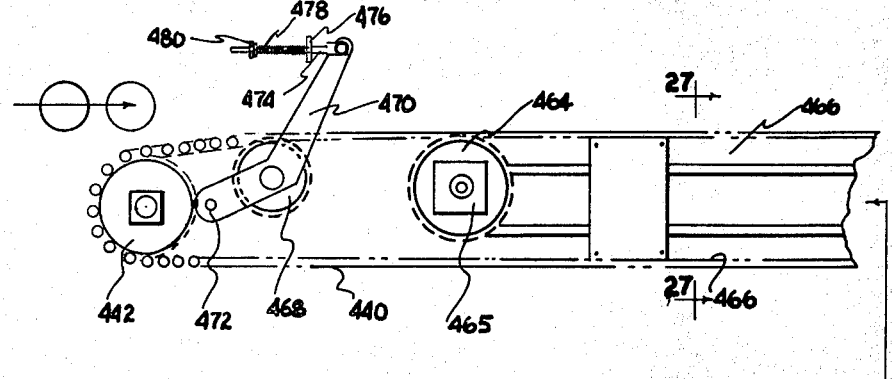
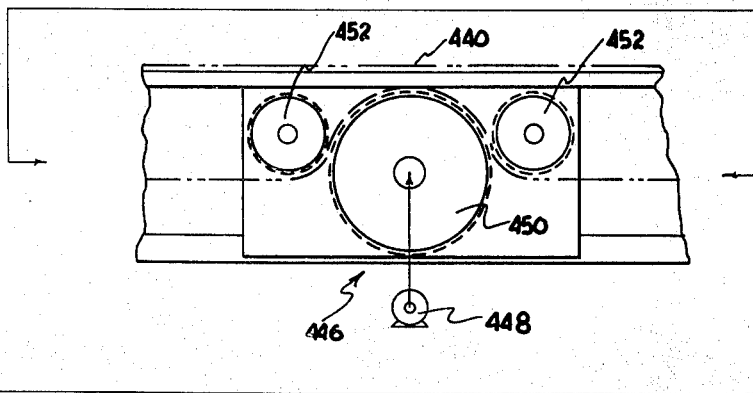
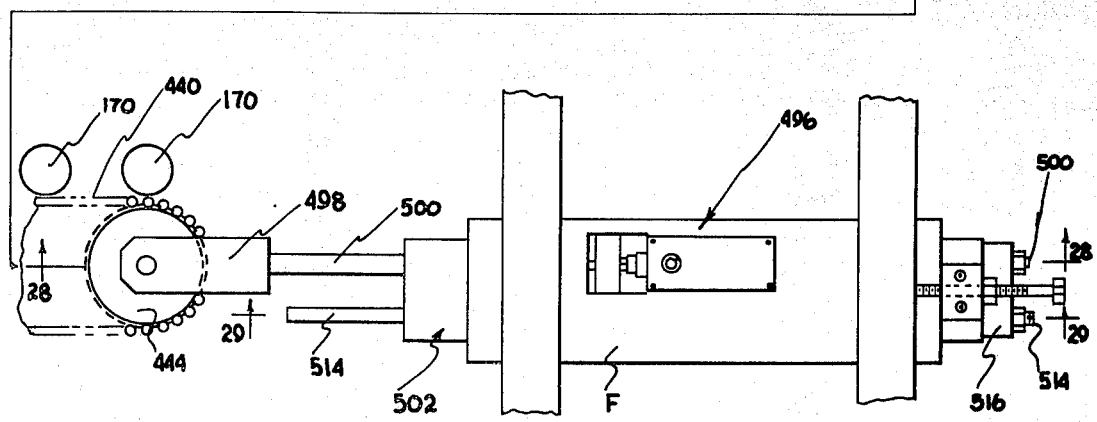
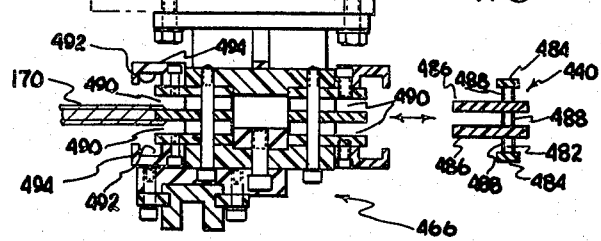

SPIN CYCLE MECHANISM FOR GLASS ARTICLE FORMING MACHINE

RELATED PATENTS AND APPLICATIONS

This application is a divisional of our copending parent application Ser. No. 419,535 filed Nov. 28, 1973, and now U.S. Pat. No. 3,902,727, which is a division of application Ser. No. 284,700 filed Aug. 30, 1972 and now U.S. Pat. No. 3,868,010, which is a division of application; Ser. No. 77,425, filed Oct. 2, 1970 now U.S. Pat. No. 3,726,659.

The machine disclosed in this application forms a portion of the overall container production line disclosed and claimed in the commonly owned copending application of Richard A. Heaton, et al, Ser. No. 24,721, filed Apr. 1, 1970, now U.S. Pat. No. 3,703,363. Containers are loaded into the machine of the present invention by a transfer machine which forms the subject matter of another commonly owned copending application of John D. Banyas, Ser. No. 825,850, filed May 19, 1969, now U.S. Pat. No. 3,590,982. The container which is handled by the machine of the present invention forms the glass portion of the composite container disclosed and claimed in Heaton's U.S. Pat. No. 3,372,826.

BACKGROUND OF THE INVENTION

As explained in detail in the aforementioned copending Heaton, et al U.S. Pat. No. 3,703,363, the glass container of Heaton U.S. Pat. No. 3,372,826 is initially formed in a ribbon-type forming machine with a moil or waste portion formed integrally with the container body and projecting upwardly from the container body. The purpose of the integrally formed moil is to enable the freshly formed container to be handled immediately upon its removal from the forming machine, at a time when the temperature of the freshly-formed container is so high that mechanical handling elements may mar or deform those portions of the container with which they come in contact. The transfer machine of the aforementioned Banyas U.S. Pat. No. 3,509,982 is designed to take the freshly formed containers from the ribbon machine by grasping the moil portion of the freshly formed containers, thus avoiding contact with that portion of the article which will form the ultimate finished container.

The function of the present machine and method is to receive the containers with the integrally formed moil from the transfer machine of Banyas U.S. Pat. No. 3,509,982, to sever the moil portion and to form the container finish after the moil has been severed.

SUMMARY OF THE INVENTION

Containers with integrally formed moil portions are loaded onto the individual chunks in an upright position at a loading point on the horizontal upper run of the endless conveyor. The chuck assemblies include a seat engageable with the bottom of the container and three symmetrically disposed releasable gripping fingers which engage the body portion of the container to grip and center the container with its axis coincident with an axis of rotation established for the chuck upon its chain carried chuck assembly. The coincident axes extend in a true vertical direction on both the horizontal upper and lower runs. Each chunk includes a sprocket which is engageable with various chains mounted along selected portions of the chuck path to drive the chuck in rotation as it passes along the chain. After the containers are loaded onto the chucks, they pass along the upper run of the conveyor between a pair of opposed "pre-heat" burners which extend along opposite sides of the path of movement of the containers. The "pre-heat" burners extend along the upper run of the conveyor and around the first end turn section and function to maintain the temperature of the container within a predetermined range during its passage of this portion of their path. A stationary chain engages the chuck sprockets on the upper run to drive the chucks and supported containers in continued rotation to achieve an even exposure of the containers to the pre-heat burners.

After the containers pass around the end turn section, they are inverted and move into a main burner section which includes opposed burners of novel construction extending along the lower run of the conveyor at opposite sides of the path of movement of the containers. The main burners produce a linear row of narrow flame jets which are directed accurately to a narrow band on the containers at the juncture of the moil portion and container body portion. During their passage through the main burners, the chuck sprockets are engaged by one run of an endless chain which is driven by a reversible variable speed drive in a direction and speed such that a selected rate of rotation of the containers is maintained during their passage through the main burners. During their transit through the first section of the main burners, the moil portion is thermally severed by the action of the flame jets and drops freely from the container body. A beaded finish is formed on the severed edge as the containers pass through the remaining section of the burners.

Although the machine and method are specifically described in terms of handling a specific glass container, the invention is equally capable of handling other types of glass containers or hollow glass articles initially formed as a blank with an integral moil, such as electric light bulb envelopes or glass tumblers, for example.

Other objects, features and advantages of the invention will become apparent in the following specification and in the drawings.

IN THE DRAWINGS

FIG. 2 is a plan view, with certain parts broken away or omitted, of a stationary spin cycle chain;

FIG. 3 is a detailed cross-sectional view taken on line 25—25 of FIG. 2;

FIG. 4 is a plan view, with certain parts broken away or omitted, of the variable speed spin cycle mechanism;

FIG. 5 is a cross-sectional view taken on line 27—27 of FIG. 4.

GENERAL DESCRIPTION

Figure 1:
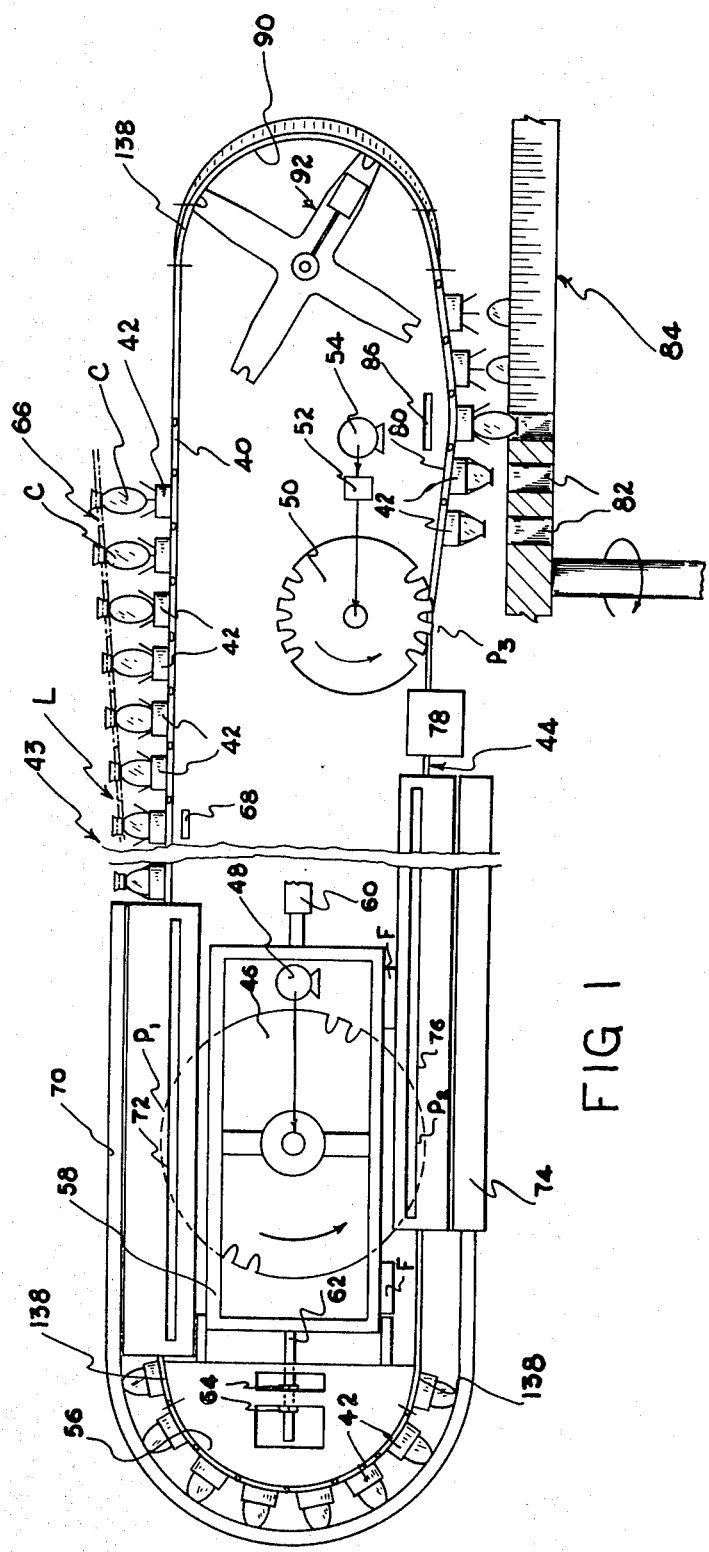
FIG. 1 is a very schematic side elevational diagram of a burn-off machine embodying the present invention.

The function of the burn-off machine of the present invention is to receive containers C having an integral moil or waste portion M projecting upwardly from the container finish, to burn off the moil M and form a beaded finish FIN on the container, and to subsequently deposit the container into a pocket conveyor.

The burn-off machine forms a part of the overall container production line which is the subject matter of a commonly owned copending application of Richard A. Heaton, et al, Ser. No. 24,721 filed Apr. 1, 1970 now U.S Pat. No. 3,703,363. In this particular production line, the bulb-shaped containers are formed on a ribbon machine with an integral moil portion projecting upwardly from the container mouth or finish. The containers are severed from the ribbon on the ribbon machine at the top of this moil portion and the moil portion is simultaneously grasped by a finger assembly on a transfer machine which forms the subject matter of U.S. Pat. No. 3,590,982. The finger assembly of the transfer machine is adapted to grasp the freshly formed container by the moil portion, because at the time the container is engaged by the transfer machine, it is still at a relatively high temperature from the forming operation and susceptible to being marred or deformed by the finger assemblies of the transfer machine. To complete the container, it is necessary that the moil portion be subsequently severed from the container and that a beaded finish be formed at the point of severance.

In FIG. 1, an extremely schematic diagram of the burn-off machine is presented for the purpose of affording an overall view of the machine and the relationship of the individual mechanisms and components to each other. The various components and mechanisms will be individually described in detail below, their relative sizes and locations being such that it is not possible to show details of all mechanisms in a single view.

Referring to FIG. 1, the burn-off machine takes the form of an endless chain conveyor, the chain of which is schematically illustrated at 40. A series of uniformly spaced container chunks 42 are mounted upon and carried by the chain in continuous movement along an endless path having horizontally extending upper and lower runs 43 and 44 respectively. Chain 40 is supported and guided in movement along its endless path by chain tracks mounted upon the machine frame F, not shown in FIG. 1, but described in greater detail below. Chain 40 is driven along its endless path in a counterclockwise direction as viewed in FIG. 1 by a main drive sprocket 46 driven in in turn by a main drive motor 48, and also by a slave drive sprocket 50 which is drivingly coupled through a slip clutch 52 to a slave drive motor 54.

Main drive sprocket 46 is meshed with both the upper and lower run of chain 40 at points P-1 and P-2 and supplies the major portion of the driving force for chain 40. The remaining minor portion of the necessary driving force is supplied by slave drive sprocket 50 which is meshed with the lower run of chain 40 at point P-3 and driven by its drive motor 54 through slip clutch 52. Motor 54 is driven at a rate such that slave drive sprocket 50 attempts to move chain 40 at a faster speed than chain 40 is driven by main drive sprocket 46, part of the excess power being applied to tension chain 40 and the remainder absorbed in slip clutch 52. The purpose of slave drive sprocket 50, in addition to that of supplying a portion of the motive power to chain 40 is to maintain a constant tension in that portion of chain 40 on lower run 44 between points P-2 and P-3. By employing two drives, the magnitude of the chain tension is reduced — there are two drives each effectively pulling a short length of chain rather than a single drive pulling one long length of chain.

Overall tensioning of the chain is accomplished by mounting main drive sprocket 46 and that portion of the chain track defining the left-hand end turn 56 of the chain path upon a sub-frame 58 which is mounted for sliding movement from right to left and vice versa as viewed in FIGS. 1 and 4 upon the fixed frame F, of the burn-off machine. Sub-frame 58 can be shifted horizontally as viewed in FIG. 1 relative to the fixed frame as by a screw jack mechanism schematically illustrated at 60 to establish overall chain tension. Adjustment of sub-frame 58 relative to the fixed frame by the jack mechanism 60 establishes the tension of the major portions of the horizontal upper and lower runs 43 and 44 of chain 40 i.e. that portion of the chains to the right of the points P-2 and P-3 enmeshed with sprocket 46. While it is desired to have an adequate amount of tension in the horizontal runs of the chain, it is desired to have the chain somewhat looser in its passage around end turn 56 and thus end turn 56 is in turn mounted upon sub-frame 58 for horizontal adjustment relative to sub-frame 58 by a threaded adjustment rod fixed to sub-frame 58 and coupled to end turn 56 by a pair of nuts 64.

Containers C are loaded upon chunks 42 of the burn-off machine by the transfer machine of the aforementioned Banyas U.S. Pat. No. 3,590,982 partially indicated at 66 in FIG. 1. The containers C, supported from their moil portion M upon transfer machine 66 are lowered into chucks 42 as the transfer machine and chunks move in synchronism to the left along upper run 43 of the burn-off machine. Support of the containers is transferred from transfer machine 66 to the individual chucks 42 at the loading point designated L on FIG. 1. As described in greater detail below, the chunks 42 include three container gripping fingers which are maintained in an open position until the container C is deposited by transfer machine 66 onto chuck 42, at which time the chuck fingers are closed by a closing mechanism schematically indicated at 68.

As the chucks 42 with their supported containers move to the left along upper run 43 away from loading point L, the containers pass between a pair of opposed elongate burners 70 which apply heat to the container around the region at which the moil portion is integrally joined to the container. Burners 70 are sometimes referred to as pre-heat burners although their function might be more accurately described as that of maintaining a controlled rate of cooling of the finish region of the container during its transit between loading point L and the location at which the moil is burned off. The containers, at the time they are received by the burn-off machine at loading point L are at a temperature of between 900° and 1000°F and at the commencement of the actual burning off of the moil it is desired to have the temperature of the container at between 800° and 900°F. Burners 70 can be regulated to achieve the desired temperature drop which would otherwise be dependent on such variable factors as ambient plant temperature, line speed, etc.

In order to achieve even exposure of the container around its entire circumference to the action of opposed burners 70, the container chucks and their supported containers are driven in rotation by an upper spin cycle device schematically indicated at 72. As indicated in FIG. 1, burner 70 is continued around end turn 56 and terminates at the upstream end of the main burn-off and finish forming burners 74. As the chucks enter the main burners 74, they are operatively engaged and again driven in rotation by a second spin cycle mechanism schematically indicated at 76.

As the chucks 42 with the supported containers pass around end turn 56, the container is moved into an inverted position, with the moil portion which is to be burned off now being at the lower end of the container as supported on the chuck so that the moil portion can drop freely from the container upon severance. Main burner 74 is constructed with a first or burn-off section of opposed burners which extend along the line of travel of the finish portion of the container and direct narrow high-intensity flame jets, in a manner to be described in more detail below, at the line of desired severance. During its passage between the main burners, the container is continuously driven in rotation at a controlled rate by spin cycle mechanism 76. The heat applied by the burners is adjusted so that severance of the moil portion from the container will occur when the container is approximately one half of the way through main burners 74. During the latter half of its passage through main burner 74, the burners continue to apply heat to the severed edge of the container and this heating action, combined with the rotation of the container by spin cycle mechanism 76, acts to form a beaded finish on the container.

After the containers pass beyond main burners 74, they are conveyed through an inspection station 78 which inspects the newly formed finish and is operable, by manipulation of the chuck 42, to cause ejection of a container having a malformed finish.

After passing to the right beyond inspection station 78, chain 40 and the supported chucks pass along a downwardly inclined portion 80 of the chain path to lower the inverted containers partially into container receiving pockets 82 of a schematically illustrated pocket conveyor 84 driven in synchronism with chucks 42 of the burn-off machine. chucks 42 are constructed in a manner to be described in more detail below, so that during their passage along inclined section 80, the containers are maintained in a vertical position for free entry into pockets 82. A chuck opening mechanism schematically illustrated at 86 causes the chucks to open at the lower end of inclined path section 80 to release the container to permit it to freely drop the remaining distance into the aligned pocket 82 of conveyor 84.

During its passage around the right-hand end turn 90 of its endless path, chain 40 passes into operative relationship with a chain lubricating mechanism designated generally 92 which is periodically actuated, in a manner to be described in greater detail below, to lubricate the chain.

This divisional case is directed to details of the spin cycle mechanism of the apparatus generally described above. Detailed description of the overall machine is fully set forth in the original patent application which has now been issued as U.S. Pat. No. 3,726,659. Reference may be had to U.S. Pat. No. 3,726,659 for specific details not set forth in the following description.

SPIN CYCLE MECHANISM

Two types of spin cycle mechanisms are employed to drive the chunks in rotation during their passage through pre-heat burner 70 and main burners 74. Spin cycle mechanism 72, which extends along the upper run portion of pre-heat burner 70 takes the form of a stationary chain mounted alongside the path of movement of chuck sprockets 170 to engage the sprockets as their chucks traverse this portion of the path. The rate of rotation of the chuck and its supported container, by spin cycle mechanism 72, is thus directed dependent upon the line speed of the chuck. The rate of rotation of the container during its passage through the pre-heat burner 70 is not overly critical, because the sole requirement is that the container be more or less uniformly exposed around its circumference to burners 70.

The rate of rotation of the containers as they pass through main burner 74, where the moil severing and finish forming operations are preformed, is more critical, and spin cycle mechanism 76 takes the form of an endless chuck sprocket engaging chain which is driven by a reversible variable speed drive motor so that the rate of rotation of the containers may be varied in accordance with the algebraic difference of the chuck and chain speeds.

Spin cycle mechanism 72 is shown in FIGS. 2 and 3. It includes a length of sprocket chain 380 which is supported over most of its length within a chain track or support designated generally 382 which in turn is supported upon the fixed frame F of the machine by suitably spaced mounting brackets 384. Chain track 382 extends alongside the path of movement of chuck sprockets 170 to maintain chains 380 in engagement with chuck sprockets 170, the forward motion of the sprockets causing the stationary chain to drive the sprockets in rotation as they move from right to left as viewed in FIG. 2.

Referring to the cross-sectional view of FIG. 3, it is seen than chain 380 includes a plurality of pins such as 386, which interconnect an inner pair of spaced links 388 and a pair of outer links 390. The chain is supported to track 382 with its pins in a vertical position by a central track member 392 of generally E-shaped cross-section which is secured to and supported upon mounting brackets 384 and upper and lower retainer strips 394 of channel-shaped cross-section which are fixedly secured, as by bolts, not shown, to track member 392. At the upstream end (right-hand end as viewed in FIG. 2) of chain track 382, three adjacent chain pins 386 are replaced by pins of extended construction 396, the pins 396 extending through all of the chain links and being received within aligned bores which pass vertically through the retainer members 394 to fixedly anchor the chain to track 382 at this point. Otherwise, the chain merely rests within the track 394 in the manner shown in the cross-sectional view of FIG. 3.

The purpose of anchoring chain 380 by means of pins 396 is twofold. It enables different degrees of tension to be applied to those sections of chain 380 to the left and to the right of pins 396 and also serves as a fixed anchoring point to isolate the tension of the chain at one side of pins 396 from the tension of the chain on the opposite side of pins 396. These two features are both related to achieving a satisfactory initial engagement between the moving chunk sprockets 170 and the chain.

The upstream end of chain 380 — i.e. that portion to the right of pins 396 as viewed in FIG. 2 — has its free end anchored upon a lever 398 pivotally supported as at 400 on a mounting bracket 402 which is in turn fixed to the machine frame F. A bolt 404 is fixedly mounted upon bracket 402 and passes freely through an opening 406 in lever 298. A compression spring 408 is seated between lever 398 and an adjustment nut 410 threadably received on the end of bolt 404. It is believed apparent that by suitable adjustment of nut 410, an adjusted resiliently maintained tension can be applied to that portion of chain 380 to the right of pins 396 as viewed in FIG. 2.

At a location intermediate pins 396 and lever 398, chain 380 is engaged by a resilient strut assembly designated generally 412. Strut assembly 412 includes a hollow tubular sleeve 414 which is pivotally coupled at one end to chain 380 as at 416. Sleeve 414 slidably receives one end of a pin 418 which is pivotally supported at its opposite end upon machine frame F as as 420. A compression spring 422 is engaged between a shoulder on pin 418 and an adjustment nut 414 threadably received on the outer side of sleeve 414. Spring 422 thus tends to extend the length of strut 412 with a resiliently applied force.

It will be observed from FIG. 2 that that section of chain 380 between pins 396 and 398 is not parallel to the path of movement of chuck sprockets 170, but converges toward the sprocket path in its extent from lever 398 toward pins 396.

Because the rotative orientation of chuck sprockets 170 as they approach chain 380 is completely random, the initial engagement between a tooth on the chuck sprocket and a chain pin on chain 380 will not always be at a mechanically desired relationship. Further, the chuck sprocket is moving at a constant velocity, while the chain pin is stationary, thus resulting in a fairly substantial impact at the initial movement of full contact. This impact is to some extent cushioned by the resilient, relatively light tensioning bias applied to this section of the chain by lever 398, while strut 412 resiliently resists lateral whipping of this rather loosely tensioned section of the chain under the impacting caused by the initial chain-chuck sprocket engagement. The convergent relationship of this section of the chain to the sprocket path also permits the sprocket to initially contact any one of several different chain pins, depending upon the rotative position of the sprocket, thus distributing the wear due to impacting over several chain pins.

That portion of chain 380 to the left of pins 396 as viewed in FIG. 2 is somewhat more tightly tensioned by passing the free end of the chain around a sprocket 426 rotatably mounted on the machine frame at 428.

This free end of the chain is coupled to a rod 430 slidably received within and projecting through a mounting block 432 fixedly mounted on the machine frame. A compression spring 434 is engaged between block 432 and an adjustment nut 436 threadably mounted on the end of rod 430 is employed to establish the desired tension adjustment and take care of chain stretch.

A generally similar stationary chain-type spin cycle mechanism (not shown) is also employed at inspection station 78 to rotate the chucks as they pass through the inspection station.

Details of the variable speed spin cycle assembly 76 employed to rotate the chucks during their passage through main burners 74 are best shown in FIGS. 3 through 5 inclusive.

Referring first to FIG. 3, spin cycle mechanism 76 includes an endless chain 440 which is operatively trained around an upstream end sprocket 442 and a downstream end sprocket 444, the terms upstream and downstream referring to the direction of movement of chuck sprockets 170. Chain 440 is driven in movement along its endless path by a reversible variable speed drive mechanism designated generally 446 which includes a reversible variable speed drive motor 448 which is drivingly coupled to a drive sprocket 450 mounted for rotation in the machine frame. A pair of idler sprockets 452 mounted in the machine frame for free rotation adjacent sprocket 450 confine the path of chain 440 to one which extends around a substantial portion of the periphery of main drive sprocket 450 in a more or less conventional arrangement.

As was the case with the stationary chain spin cycle mechanism previously described, the path of chain 440 converges from upstream end sprocket 442 toward the path of chuck sprockets 170. Chain 440, in passing from end sprocket 442 toward the path of chuck sprockets 170 is trained around a guide sprocket 464 mounted in the machine frame for free rotation about a stationary axis as at 465. Immediately to the right of sprocket 464, as viewed in FIG. 26, the chain is engaged within a chain track 466 which supports and guides chain 440 in movement.

Between sprockets 442 and 464, that run of chain 440 adjacent the chuck sprocket path is engaged by a sprocket 468 mounted for free rotation upon a bell crank 470. Bell crank 470 is mounted at one end for pivotal movement upon the machine frame as by a fixed pivot 472. The opposite end of bell crank 470 is pivotally coupled to a rod 474 slidably mounted in a bracket 476 fixedly mounted upon the machine frame. A compression spring 478 engaged between bracket 476 and an adjustment nut 480 threadably received on rod 474 resiliently biases bell crank 470 in a counterclockwise direction about pivot 472 as viewed in FIG. 3, thus urging sprocket 468 against chain 440 to bow the chain outwardly toward the path of chuck sprockets 170. Bell crank 470 and its sprocket 468 perform the same function as did adjustable strut assembly 412 of spin cycle mechanism 72.

Referring now to FIG. 5, there is shown in this Figure a typical cross-section of chain track 466. Preferably, the track assembly is built-up, as indicated, from individual layers of strip stock to form opposed guide channels complementary in shape to the chain cross-section. Chain 440 is formed with chain pins 482 which carry rollers 484 at each end. A pair of links 486 are carried on the pin between rollers 484, the links being maintained in spaced relationship to each other and to rollers 484 by tubular spacers 488 loosely received upon chain pin 482 and mounted between the rollers and links. In their transverse extent, the links 486 are not symmetrically disposed with respect to the chain pin, but are extended on the inner side of the chain to slidably project into complementary recesses 490 formed in the chain track 466. Rollers 484 of the chain are received within grooves 492 formed in channel-shaped retainer members 494 of the chain track assembly. As indicated in FIG. 27, chuck sprockets 170 engage the chain between links 486, all of the various sprockets engaging the chain at the outer sides of links 486.

Downstream end sprocket 444 is mounted upon and supported by a chain tensioning mechanism designated generally 496 which acts to apply operative tension to the chain.

Details of the chain tensioning mechanism form the subject matter of a parent application which has been issued as U.S. Pat. No. 3,868,010 to which reference may be had for further details of this portion of the machine. In brief, this chain tensioning mechanism finds end sprocket 444 mounted for movement toward and away from the opposite end sprocket and a spring loaded tensioning device is employed to adjustably bias end sprocket 444 in a tension applying direction.

Chucks carrying containers having satisfactory finishes are not opened at inspection station 78, but proceed to the right along the lower run of the conveyor as viewed in FIG. 1 and pass on to the downwardly inclined track section 80, with the containers maintained in vertical alignment with a pocket 82 on the synchronized pocket conveyor 84. During their passage down inclined track section 80, the chuck and container axes are maintained in a vertical position by track 164 which guides rollers 162 on the chuck housing. The relationship of track 164 to inclined track section 80 is such that the chuck housing 140 is pivoted slightly about the axis of the link pin upon which it is supported to maintain the axes in a true vertical position. The containers, as they pass down inclined section 80 are lowered partially into the pockets of conveyor 84. At the lower end of inclined section 80, a stationary cam 86 on the machine frame engages the chuck actuating rollers to open the chucks which are immediately latched in the open position by latches 250. The container drops freely the remaining distance into the aligned pocket 82 of the pocket conveyor. The chucks remain latched in their open position until they again reach loading point L.

While we have described two embodiments of our invention it will be apparent to those skilled in the art that the disclosed embodiments may be modified. Therefore, the foregoing description is to be considered exemplary rather than limiting and the true scope of the invention is that defined in the following claims.

We claim:

1. In an article handling apparatus having a plurality of article supporting chucks, a frame, and drive means for driving said chucks in succession upon said frame along a fixed path, each of said chucks having a chuck sprocket thereon mounted for rotation about an axis normal to said path for rotating an article supported in the chuck; a spin cycle mechanism for driving said chuck sprockets in rotation as the chucks are driven along a selected portion of said fixed path comprising a sprocket chain, first support means supporting a first portion of said chain alongside and parallel to said selected portion of said path to meshingly engage and rotate chuck sprockets as the chucks are driven along said selected portion of said path, second support means mounted adjacent said path at a location spaced upstream of the direction of movement of said chucks along said path from said first portion of said chain, a second portion of said chain supported by and extending from said second support means and connected to said first portion of said chain at the upstream end of said first support means, said second portion of said chain being located clear of the path of movement of said chuck sprockets at said second support means and converging with the path of said sprockets in its extent toward said first support means to define a convergent initial sprocket engaging section of said chain, first tension applying means for applying a first tension to said first portion of said chain, and independent second tension applying means for applying a second tension to said second portion of said chain.

2. Spin cycle mechanism as defined in claim 1 wherein said second tension applying means comprises spring means for exerting a resiliently applied tension to said second portion of said chain.

3. Spin cycle mechanism as defined in claim 2 further comprising resilient means engaged with said second portion of said chain at a location intermediate said first and said second support means for resiliently urging the engaged point of said second portion of said chain toward the path of said sprockets.

4. Spin cycle mechanism as defined in claim 3 wherein said first support means is fixedly mounted upon said frame, and means detachably securing said first and said second portions of said chain to said first support means at the upstream end thereof.

5. Spin cycle mechanism as defined in claim 3 wherein said sprocket chain is an endless chain, said first and said second tension applying means both comprising end sprockets about which said endless chain is operatively trained, said chain extending between said end sprockets in first and second runs with said first and said second portions of said chain constituting said first run, a third sprocket meshed at opposed points with said second run of said chain and with said first run of said chain at the juncture of the first and second portions thereof, and variable speed reversible drive means enmeshed with said second run of said sprocket chain for driving said chain.

6. In an endless chain drive system comprising a frame, a pair of end sprockets mounted in said frame for rotation about spaced parallel axes, an endless chain operatively trained about said end sprockets, and drive means for driving said chain in movement along an endless path; tensioning means for applying tension to said chain comprising a yoke member supporting one of said end sprockets, a ratchet rod slidably mounted in said frame and fixedly secured to said yoke to support said yoke and sprocket for sliding movement on said frame relative to the other of said sprockets between a first position wherein a minimum amount of tension is applied to said chain and a second position wherein a maximum amount of tension is applied to said chain, first spring means resiliently biasing said ratchet rod toward said second position, a plurality of ratchet teeth on said rod, a pawl slidably mounted in said frame for movement into and out of engagement with said ratchet teeth, said teeth and said pawl having complementary inclined slidably engageable surfaces accomodating movement of said rod toward said second position and complementary engageable locking surfaces operable when engaged to lock said rod against movement toward said first position, second spring means biasing said pawl into engagement with said ratchet teeth, and release means operable to withdraw and maintain said pawl out of engagement with said ratchet teeth.

* * * * *

UNITED STATES PATENT OFFICE
CERTIFICATE OF CORRECTION

PATENT NO. : 3,968,870
DATED : July 13, 1976
INVENTOR(S) : John D. Banyas, Edward A. Ross It is certified that error appears in the above-identified patent and that said Letters Patent are hereby corrected as shown below:

Col. 1, line 42, "3,509,982" should be --3,590,982--;
      line 51, "3,509,982" should be --3,590,982--;
      line 56, "chunks" should be --chucks--;
      line 66, "chunk" should be --chuck--.

Col. 3, line 31, "chunks" should be --chucks--.

Col. 4, line 19, "chunks" should be --chucks--;
      line 25, "chunks" should be --chucks--;
      line 29, "chunks" should be --chucks--.

Col. 5, line 32, "chucks" should be --Chucks--;
      line 58, "chunks" should be --chucks--;
      line 66, "directed" should be --directly--.

Col. 6, line 27, "than" should be --that--;
      line 30, "to" should be --in--;
      line 54, "chunk" should be --chuck--;
      line 62, "298" should be --398--.

UNITED STATES PATENT OFFICE
CERTIFICATE OF CORRECTION

Patent No. 3,968,870     Dated July 13, 1976

Inventor(s) John D. Banyas, Edward A. Ross

It is certified that error appears in the above-identified patent and that said Letters Patent are hereby corrected as shown below:

Col. 7, line 9, "414" should be --424--.

Col. 8, line 14, "24" should be --4--;
        line 52, "27" should be --5--.

Signed and Sealed this

Twenty-first Day of June 1977

[SEAL]

Attest:

RUTH C. MASON
Attesting Officer

C. MARSHALL DANN
Commissioner of Patents and Trademarks